US010192333B1

(12) United States Patent
Lu et al.

(10) Patent No.: US 10,192,333 B1
(45) Date of Patent: *Jan. 29, 2019

(54) GENERATING GRAPHICAL REPRESENTATIONS OF EVENT PARTICIPATION FLOW

(71) Applicant: Palantir Technologies Inc., Palo Alto, CA (US)

(72) Inventors: Catherine Lu, Palo Alto, CA (US); Karanveer Mohan, Menlo Park, CA (US); Jacob Stern, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/222,768

(22) Filed: Jul. 28, 2016

Related U.S. Application Data

(63) Continuation of application No. 14/948,009, filed on Nov. 20, 2015, now Pat. No. 9,424,669.

(Continued)

(51) Int. Cl.
*G06T 11/20* (2006.01)
*G06F 3/0482* (2013.01)
(Continued)

(52) U.S. Cl.
CPC .......... *G06T 11/206* (2013.01); *G06F 3/0482* (2013.01); *G06F 3/04883* (2013.01); *H04L 43/045* (2013.01); *H04L 43/062* (2013.01)

(58) Field of Classification Search
None
See application file for complete search history.

(56) References Cited

U.S. PATENT DOCUMENTS 5,632,009 A    5/1997  Rao et al.
6,430,305 B1   8/2002  Decker
(Continued)

FOREIGN PATENT DOCUMENTS

AU    2014250678      2/2016
CN    102546446 A     7/2012
(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.

(Continued)

*Primary Examiner* — Yi Wang
(74) *Attorney, Agent, or Firm* — Schwegman Lundberg & Woessner, P.A.

(57) ABSTRACT

A system comprising a computer-readable storage medium storing at least one program and a method for generating graphical representations of event participation flows are presented. In example embodiments, the method includes determining an event participation flow for participants of a subject event, and causing presentation of a graphical representation of the event participation flow in the user interface. The method may further include receiving a user selection of a filter via the user interface, and filtering the graphical representation of the event participation flow in accordance with the user selected filter.

20 Claims, 11 Drawing Sheets

Related U.S. Application Data

(60) Provisional application No. 62/244,585, filed on Oct. 21, 2015.

(51) Int. Cl.
  *G06F 3/0488* (2013.01)
  *H04L 12/26* (2006.01)

(56) References Cited

U.S. PATENT DOCUMENTS

| | | |
|---|---|---|
| 6,456,997 B1 | 9/2002 | Shukla |
| 6,594,672 B1 | 7/2003 | Lampson et al. |
| 6,820,135 B1 | 11/2004 | Dingman et al. |
| 6,978,419 B1 | 12/2005 | Kantrowitz |
| 6,980,984 B1 | 12/2005 | Huffman et al. |
| 7,168,039 B2 | 1/2007 | Bertram |
| 7,451,397 B2 | 11/2008 | Weber et al. |
| 7,617,232 B2 | 11/2009 | Gabbert et al. |
| 7,756,843 B1 | 7/2010 | Palmer |
| 7,800,796 B2 | 9/2010 | Saito |
| 7,917,376 B2 | 3/2011 | Bellin et al. |
| 7,941,321 B2 | 5/2011 | Greenstein et al. |
| 7,971,150 B2 | 6/2011 | Raskutti et al. |
| 8,036,971 B2 | 10/2011 | Aymeloglu et al. |
| 8,046,283 B2 | 10/2011 | Burns et al. |
| 8,054,756 B2 | 11/2011 | Chand et al. |
| 8,196,184 B2 | 6/2012 | Amirov et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,290,926 B2 | 10/2012 | Ozzie et al. |
| 8,302,855 B2 | 11/2012 | Ma et al. |
| 8,473,454 B2 | 6/2013 | Evanitsky et al. |
| 8,484,115 B2 | 7/2013 | Aymeloglu et al. |
| 8,554,709 B2 | 10/2013 | Goodson et al. |
| 8,589,273 B2 | 11/2013 | Creeden et al. |
| 8,595,234 B2 | 11/2013 | Siripurapu et al. |
| 8,639,757 B1 | 1/2014 | Zang et al. |
| 8,650,492 B1 * | 2/2014 | Mui .............. G06F 17/30873 715/736 |
| 8,676,857 B1 | 3/2014 | Adams et al. |
| 8,688,573 B1 | 4/2014 | Rukonic et al. |
| 8,744,890 B1 | 6/2014 | Bernier et al. |
| 8,787,939 B2 | 7/2014 | Papakipos et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,116,975 B2 | 8/2015 | Shankar et al. |
| 9,146,954 B1 | 9/2015 | Boe et al. |
| 9,424,669 B1 | 8/2016 | Lu et al. |
| 2002/0065708 A1 | 5/2002 | Senay et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0147805 A1 | 10/2002 | Leshem et al. |
| 2003/0036848 A1 | 2/2003 | Sheha et al. |
| 2003/0126102 A1 | 7/2003 | Borthwick |
| 2003/0229848 A1 | 12/2003 | Arend et al. |
| 2004/0032432 A1 | 2/2004 | Baynger |
| 2004/0034570 A1 | 2/2004 | Davis |
| 2004/0111410 A1 | 6/2004 | Burgoon et al. |
| 2004/0111480 A1 | 6/2004 | Yue |
| 2004/0153418 A1 | 8/2004 | Hanweck |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0236688 A1 | 11/2004 | Bozeman |
| 2005/0010472 A1 | 1/2005 | Quatse et al. |
| 2005/0065811 A1 | 3/2005 | Chu et al. |
| 2005/0078858 A1 | 4/2005 | Yao et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0074881 A1 | 4/2006 | Vembu et al. |
| 2006/0143034 A1 | 6/2006 | Rothermel et al. |
| 2006/0143075 A1 | 6/2006 | Carr et al. |
| 2006/0184889 A1 | 8/2006 | Molander |
| 2006/0209085 A1 | 9/2006 | Wong et al. |
| 2006/0242040 A1 | 10/2006 | Rader |
| 2007/0000999 A1 | 1/2007 | Kubo et al. |
| 2007/0011304 A1 | 1/2007 | Error |
| 2007/0038646 A1 | 2/2007 | Thota |
| 2007/0150369 A1 | 6/2007 | Zivin |
| 2007/0150801 A1 | 6/2007 | Chidlovskii et al. |
| 2007/0156673 A1 | 7/2007 | Maga et al. |
| 2007/0185867 A1 | 8/2007 | Maga et al. |
| 2007/0192265 A1 | 8/2007 | Chopin et al. |
| 2007/0208736 A1 | 9/2007 | Tanigawa et al. |
| 2007/0284433 A1 | 12/2007 | Domenica et al. |
| 2008/0040275 A1 | 2/2008 | Paulsen et al. |
| 2008/0162616 A1 | 7/2008 | Gross et al. |
| 2008/0222295 A1 | 9/2008 | Robinson et al. |
| 2008/0249983 A1 | 10/2008 | Meisels et al. |
| 2008/0255973 A1 | 10/2008 | El Wade et al. |
| 2008/0313132 A1 | 12/2008 | Hao et al. |
| 2009/0055251 A1 | 2/2009 | Shah et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0187546 A1 | 7/2009 | Whyte |
| 2009/0187548 A1 | 7/2009 | Ji et al. |
| 2009/0249244 A1 | 10/2009 | Robinson et al. |
| 2009/0271343 A1 | 10/2009 | Vaiciulis et al. |
| 2009/0307049 A1 | 12/2009 | Elliott, Jr. et al. |
| 2009/0313463 A1 | 12/2009 | Pang et al. |
| 2009/0319891 A1 | 12/2009 | MacKinlay et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith |
| 2010/0070842 A1 | 3/2010 | Aymeloglu et al. |
| 2010/0098318 A1 | 4/2010 | Anderson |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0228812 A1 | 9/2010 | Uomini |
| 2010/0235915 A1 | 9/2010 | Memon et al. |
| 2010/0262688 A1 | 10/2010 | Hussain et al. |
| 2010/0312837 A1 | 12/2010 | Bodapati et al. |
| 2010/0325526 A1 | 12/2010 | Ellis et al. |
| 2011/0061013 A1 | 3/2011 | Bilicki et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0131547 A1 | 6/2011 | Elaasar |
| 2011/0153384 A1 | 6/2011 | Horne et al. |
| 2011/0173032 A1 | 7/2011 | Payne et al. |
| 2011/0173093 A1 | 7/2011 | Psota et al. |
| 2011/0181598 A1 | 7/2011 | O'Neall et al. |
| 2011/0208565 A1 | 8/2011 | Ross et al. |
| 2011/0213655 A1 | 9/2011 | Henkin et al. |
| 2011/0218955 A1 | 9/2011 | Tang et al. |
| 2011/0219321 A1 | 9/2011 | Gonzalez et al. |
| 2011/0258158 A1 | 10/2011 | Resende, Jr. et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0295649 A1 | 12/2011 | Fine et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |

(56) References Cited

U.S. PATENT DOCUMENTS

| | | |
|---|---|---|
| 2012/0036013 A1 | 2/2012 | Neuhaus et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0117082 A1 | 5/2012 | Koperda et al. |
| 2012/0131512 A1 | 5/2012 | Takeuchi et al. |
| 2012/0159362 A1 | 6/2012 | Brown et al. |
| 2012/0170847 A1 | 7/2012 | Tsukidate |
| 2012/0173381 A1 | 7/2012 | Smith |
| 2012/0197651 A1 | 8/2012 | Robinson et al. |
| 2012/0203708 A1 | 8/2012 | Psota et al. |
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0296907 A1 | 11/2012 | Long et al. |
| 2012/0323888 A1 | 12/2012 | Osann, Jr. |
| 2013/0006916 A1 | 1/2013 | Mcbride et al. |
| 2013/0016106 A1 | 1/2013 | Yip et al. |
| 2013/0046635 A1 | 2/2013 | Grigg et al. |
| 2013/0050217 A1 | 2/2013 | Armitage |
| 2013/0054306 A1 | 2/2013 | Bhalla et al. |
| 2013/0057551 A1 | 3/2013 | Ebert et al. |
| 2013/0073454 A1 | 3/2013 | Busch |
| 2013/0096988 A1 | 4/2013 | Grossman et al. |
| 2013/0110746 A1 | 5/2013 | Ahn |
| 2013/0110822 A1 | 5/2013 | Ikeda et al. |
| 2013/0117011 A1 | 5/2013 | Ahmed et al. |
| 2013/0151148 A1 | 6/2013 | Parundekar et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-yaniv et al. |
| 2013/0226318 A1 | 8/2013 | Procyk et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0267207 A1 | 10/2013 | Hao et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero |
| 2013/0311375 A1 | 11/2013 | Priebatsch |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0067611 A1 | 3/2014 | Adachi et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0258246 A1 | 9/2014 | Lo Faro et al. |
| 2014/0310266 A1 | 10/2014 | Greenfield |
| 2014/0316911 A1 | 10/2014 | Gross |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2015/0019394 A1 | 1/2015 | Unser et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106379 A1 | 4/2015 | Elliot et al. |
| 2015/0134666 A1 | 5/2015 | Gattiker et al. |
| 2015/0135256 A1 | 5/2015 | Hoy et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0188872 A1 | 7/2015 | White |
| 2015/0324868 A1 | 11/2015 | Kaftan et al. |
| 2015/0338233 A1 | 11/2015 | Cervelli et al. |
| 2015/0347903 A1 | 12/2015 | Saxena et al. |
| 2015/0378996 A1 | 12/2015 | Kesin et al. |
| 2015/0379413 A1 | 12/2015 | Robertson et al. |
| 2016/0004667 A1 | 1/2016 | Chakerian et al. |
| 2016/0034545 A1 | 2/2016 | Shankar et al. |
| 2016/0098173 A1 | 4/2016 | Slawinski et al. |

FOREIGN PATENT DOCUMENTS

| | | |
|---|---|---|
| CN | 103167093 A | 6/2013 |
| CN | 102054015 B | 5/2014 |
| DE | 102014204827 A1 | 9/2014 |
| DE | 102014204830 A1 | 9/2014 |
| DE | 102014204834 A1 | 9/2014 |
| EP | 1672527 A2 | 6/2006 |
| EP | 2487610 A2 | 8/2012 |
| EP | 2858018 A1 | 4/2015 |
| EP | 2863326 A1 | 4/2015 |
| EP | 2869211 A2 | 5/2015 |
| EP | 2884439 A1 | 6/2015 |
| EP | 2884440 A1 | 6/2015 |
| EP | 2889814 A1 | 7/2015 |
| EP | 2892197 A1 | 7/2015 |
| WO | WO-02065353 A1 | 8/2002 |
| WO | WO 2005116851 A2 | 12/2005 |
| WO | WO-2010098958 A1 | 9/2010 |

OTHER PUBLICATIONS

"About 80 Minutes: Palantir in a number of parts—Part 6—Graph", http://about80minutes.blogspot.com/2013/03/palantir-in-number-of-parts-part-6-graph.html, (Mar. 21, 2013), 1-7.

"About OWA", Open Web Analytics, [Online]. Retrieved from the Internet: <URL: http://www.openwebanalytics.com/?page_jd=2>, (Accessed: Jul. 19, 2013), 5 pgs.

"An Introduction to KeyLines and Network Visualization", Keylines.com, [Online], Retrieved from the Internet: <URL: http://keylines.com/wp-content/uploads/2014/03/KeyLines-White-Paper.pdf>, (Mar. 2014), 8 pgs.

"Analytics for Data Driven Startups", Trak.io, [Online]. Retrieved from the Internet: <URL: http://trak.io/>, (Accessed: Jul. 18, 2013), 3 pgs.

"U.S. Appl. No. 13/827,491, Final Office Action dated Mar. 17, 2015", 28 pgs.

"U.S. Appl. No. 13/827,491, Final Office Action dated Jun. 22, 2015", 28 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/141,252, Non Final Office Action dated Oct. 8, 2015", 11 pgs.

"U.S. Appl. No. 14/225,006, Advisory Action dated Dec. 21, 2015", 4 pgs.

"U.S. Appl. No. 14/225,006, Final Office Action dated Sep. 2, 2015", 28 pgs.

(56) References Cited

OTHER PUBLICATIONS

"U.S. Appl. No. 14/225,006, First Action Interview Pre-Interview Communication dated Feb. 27, 2015", 5 pgs.
"U.S. Appl. No. 14/225,006, First Action Interview Pre-Interview Communication dated Sep. 10, 2014", 4 pgs.
"U.S. Appl. No. 14/225,084, Examiner Interview Summary dated Jan. 4, 2016", 3 pgs.
"U.S. Appl. No. 14/225,084, First Action Interview Pre-Interview Communication Feb. 20, 2015", 5 pgs.
"U.S. Appl. No. 14/225,084, First Action Interview Pre-Interview Communication dated Sep. 2, 2014", 17 pgs.
"U.S. Appl. No. 14/225,084, Non Final Office Action dated Sep. 11, 2015", 13 pgs.
"U.S. Appl. No. 14/225,084, Notice of Allowance dated May 4, 2015", 26 pgs.
"U.S. Appl. No. 14/225,160, Advisory Action dated May 20, 2015", 7 pgs.
"U.S. Appl. No. 14/225,160, Final Office Action dated Feb. 11, 2015", 30 pgs.
"U.S. Appl. No. 14/225,160, First Action Interview Pre-Interview Communication dated Jul. 29, 2014", 19 pgs.
"U.S. Appl. No. 14/225,160, First Action interview Pre-Interview Communication dated Oct. 22, 2014", 6 pgs.
"U.S. Appl. No. 14/225,160, Non Final Office Action dated Aug. 12, 2015", 23 pgs.
"U.S. Appl. No. 14/306,138, Examiner Interview Summary dated Dec. 3, 2015", 3 pgs.
"U.S. Appl. No. 14/306,138, Examiner Interview Summary dated Dec. 24, 2015", 5 pgs.
"U.S. Appl. No. 14/306,138, Final Office Action dated Sep. 14, 2015", 31 pgs.
"U.S. Appl. No. 14/306,138, First Action Interview Pre-Interview Communication dated Sep. 23, 2014", 5 pgs.
"U.S. Appl. No. 14/306,138, Non Final Office Action dated Mar. 17, 2016", 41 pgs.
"U.S. Appl. No. 14/306,138, Non Final Office Action dated May 26, 2015", 15 pgs.
"U.S. Appl. No. 14/306,147, Final Office Action dated Feb. 19, 2015", 35 pgs.
"U.S. Appl. No. 14/306,147, Final Office Action dated Dec. 24, 2015", 22 pgs.
"U.S. Appl. No. 14/306,147, First Action Interview—Pre-Interview Communication dated Sep. 9, 2014", 6 pgs.
"U.S. Appl. No. 14/306,147, Non Final Office Action dated Aug. 7, 2015", 24 pgs.
"U.S. Appl. No. 14/306,154, Advisory Action dated Feb. 1, 2016", 3 pgs.
"U.S. Appl. No. 14/306,154, Advisory Action dated May 15, 2015", 3 pgs.
"U.S. Appl. No. 14/306,154, Final Office Action dated Mar. 11, 2015", 34 pgs.
"U.S. Appl. No. 14/306,154, Final Office Action dated Nov. 16, 2015", 14 pgs.
"U.S. Appl. No. 14/306,154, First Action Interview Pre-Interview Communication dated Sep. 9, 2014", 4 pgs.
"U.S. Appl. No. 14/306,154, Non Final Office Action dated Mar. 17, 2016", 31 pgs.
"U.S. Appl. No. 14/306,154, Non Final Office Action dated Jul. 6, 2015", 34 pgs.
"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/319,765, Advisory Action dated Sep. 10, 2015", 3 pgs.
"U.S. Appl. No. 14/319,765, Final Office Action dated Jun. 16, 2015", 37 pgs.
"U.S. Appl. No. 14/319,765, First Action Interview Pre-Interview Communication dated Feb. 4, 2015", 3 pgs.
"U.S. Appl. No. 14/319,765, First Action Interview Pre-Interview Communication dated Nov. 25, 2014", 4 pgs.
"U.S. Appl. No. 14/319,765, Non Final Office Action dated Feb. 1, 2016", 19 pgs.
"U.S. Appl. No. 14/323,935, First Action Interview Pre-Interview Communication dated Mar. 31, 2015", 6 pgs.
"U.S. Appl. No. 14/323,935, First Action Interview Pre-Interview Communication dated Nov. 28, 2014", 4 pgs.
"U.S. Appl. No. 14/323,935, Non Final Office Action dated Jun. 22, 2015", 18 pgs.
"U.S. Appl. No. 14/323,935, Notice of Allowance dated Oct. 1, 2015", 8 pgs.
"U.S. Appl. No. 14/326,738, Final Office Action dated Jul. 31, 2015", 5 pgs.
"U.S. Appl. No. 14/326,738, First Action Interview Pre-Interview Communication dated Mar. 31, 2015", 6 pgs.
"U.S. Appl. No. 14/326,738, First Action Interview Pre-Interview Communication dated Dec. 2, 2014", 5 pgs.
"U.S. Appl. No. 14/326,738, Notice of Allowance dated Nov. 18, 2015", 13 pgs.
"U.S. Appl. No. 14/451,221, Non Final Office Action dated Oct. 21, 2014", 16 pgs.
"U.S. Appl. No. 14/463,615, Advisory Action dated Sep. 10, 2015", 3 pgs.
"U.S. Appl. No. 14/463,615, Final Office Action dated May 21, 2015", 31 pgs.
"U.S. Appl. No. 14/463,615, First Action Interview Pre-Interview Communication dated Jan. 28, 2015", 29 pgs.
"U.S. Appl. No. 14/463,615, First Action Interview Pre-Interview Communication dated Nov. 13, 2014", 4 pgs.
"U.S. Appl. No. 14/463,615, Non Final Office Action dated Dec. 9, 2015", 44 pgs.
"U.S. Appl. No. 14/479,863, First Action Interview Pre-Interview Communication dated Dec. 26, 2014", 5 pgs.
"U.S. Appl. No. 14/479,863, Notice of Allowance dated Mar. 31, 2015", 23 pgs.
"U.S. Appl. No. 14/483,527, Final Office Action dated Jun. 22, 2015", 17 pgs.
"U.S. Appl. No. 14/483,527, First Action Interview Pre-Interview Communication dated Jan. 28, 2015", 6 pgs.
"U.S. Appl. No. 14/483,527, Non Final Office Action dated Oct. 28, 2015", 20 pgs.
"U.S. Appl. No. 14/504,103, First Action Interview Pre-Interview Communication dated Feb. 5, 2015", 22 pgs.
"U.S. Appl. No. 14/504,103, First Action Interview Pre-Interview Communication dated Mar. 31, 2015", 9 pgs.
"U.S. Appl. No. 14/504,103, Notice of Allowance dated May 18, 2015", 18 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/562,524, First Action Interview Pre-Interview Communication dated Sep. 14, 2015", 12 pgs.
"U.S. Appl. No. 14/562,524, First Action Interview Pre-Interview Communication dated Nov. 10, 2015", 6 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/631,633, First Action Interview Pre-Interview Communication dated Sep. 10, 2015", 5 pgs.
"U.S. Appl. No. 14/645,304, Non Final Office Action dated Jan. 25, 2016", 30 pgs.
"U.S. Appl. No. 14/676,621, Examiner Interview Summary dated Jul. 30, 2015", 5 pgs.
"U.S. Appl. No. 14/676,621, Final Office Action dated Oct. 29, 2015", 10 pgs.

(56) References Cited

OTHER PUBLICATIONS

"U.S. Appl. No. 14/746,671, First Action Interview Pre-Interview Communication dated Nov. 12, 2015", 19 pgs.
"U.S. Appl. No. 14/800,447, First Action Interview Pre-Interview Communication dated Dec. 10, 2015", 26 pgs.
"U.S. Appl. No. 14/813,749, Non Final Office Action dated Sep. 28, 2015", 22 pgs.
"U.S. Appl. No. 14/842,734, First Action Interview Pre-Interview Communication dated Nov. 19, 2015", 17 pgs.
"U.S. Appl. No. 14/874,690, Pre-Interview Communication dated Dec. 21, 2015", 4 pgs.
"U.S. Appl. No. 14/948,009, First Action Interview Pre-Interview Communication dated Feb. 25, 2016", 5 pgs.
"U.S. Appl. No. 14/948,009, Notice of Allowance dated May 6, 2016", 14 pgs.
"U.S. Appl. No. 14/948,009, Response filed Mar. 28, 2016 to First Action Interview Pre-Interview Communication dated Feb. 25, 2016", 4 pgs.
"Beta Testing on the Fly", TestFlight, [Online]. Retrieved from the Internet: <URL: https ://testflightapp. com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"Data Powered Mobile Advertising", Free Mobile App Analytics and various analytics related screen shots, (Jul. 18, 2013), 8 pgs.
"DISTIMO—App Analytics", [Online]. Retrieved from the Internet: <URL: http://www.distimo.com/app-analytics, (accessed Jul. 18, 2013), 5 pgs.
"European Application Serial No. 14187996.5, Extended European Search Report dated Feb. 12, 2015", 7 pgs.
"European Application Serial No. 14189344.6, Extended European Search Report dated Feb. 20, 2015", 8 pgs.
"European Application Serial No. 14191540.5, Extended European Search Report dated May 27, 2015", 9 pgs.
"European Application Serial No. 14197879.1, Extended European Search Report dated Apr. 28, 2015", 3 pgs.
"European Application Serial No. 14197895.7, Extended European Search Report dated Apr. 28, 2015", 3 pgs.
"European Application Serial No. 14197938.5, Extended European Search Report dated Apr. 28, 2015", 3 pgs.
"European Application Serial No. 14200246.8, Extended European Search Report dated May 29, 2015", 8 pgs.
"European Application Serial No. 14200298.9, Extended European Search Report dated May 13, 2015", 7 pgs.
"European Application Serial No. 15165244.3, Extended European Search Report dated Aug. 27, 2015", 10 pgs.
"European Application Serial No. 15166137.8, Extended European Search Report dated Sep. 14, 2015", 8 pgs.
"European Application Serial No. 15181419.1, Extended European Search Report dated Sep. 29, 2015", 7 pgs.
"European Application Serial No. 15184764.7, Extended European Search Report dated Dec. 14, 2015", 8 pgs.
"Federated Database System", From Wikipedia, (Sep. 7, 2013), 1-6.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google.com/ analytics/index.html, (accessed Jul. 18, 2013), 22 pgs.
"Great Britain Application Serial No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.
"Great Britain Application Serial No. 1404489.5, Office Action dated May 21, 2015", 3 pgs.
"Great Britain Application Serial No. 1404489,5, Office Action dated Oct. 21, 2014", 1 pgs.
"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1404499.4, Office Action dated Sep. 29, 2014", 1 pg.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com/>, (Accessed: Jul. 18, 2013), 13 pgs.
"Mobile App Marketing & Analytics", Localytics, [Online]. Retrieved from the Internet: <URL: http://www.localytics.com/>, (Accessed: Jul. 18, 2013), 12 pgs.
"ModelRisk Version 5-ModelRisk Help", Part One-Vose Software, (2007), 375 pgs.
"ModelRisk Version 5-ModelRisk Help", Part Two-Vose Software, (2003), 362 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www.kontagent.com/>, (Accessed: Jul. 18, 2013), 9 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2012417, Netherlands Search Report dated Sep. 18, 2015", W/ English Translation, 9 pgs.
"Netherlands Application Serial No. 2012421, Netherlands Search Report dated Sep. 18, 2015", 8 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 628161, First Examination Report dated Aug. 25, 2014", 2 pgs.
"Palantir Labs—Timeline", https://www.youtube.com/watch?v=JCgDW5bru9M, (Oct. 2010), 1 pg.
"Piwik—Free Web Analytics Software", Piwik, [Online]. Retrieved from the Internet: <URL: http://piwik.org/>, (Accessed: Jul. 19, 2013), 18 pgs.
"Realtime Constant Customer Touchpoint", Capptain—Pilot your apps, [Online] retrieved from the internet: <http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, (Accessed: May 18, 2015), 1 pg.
"Smart Thinking for Super Apps", [Online]. Retrieved from the Internet: <http://www.appacts.com>, (Jul. 18, 2013), 4 pgs.
"Visualizing Threats: Improved Cyber Security Through Network Visualization", Keylines.com, [Online] retrieved from the internet: <http:/ /keylines.com/wp-content/uploads/2014/04/Visualizing-Threats1.pdf>, (May 12, 2014), 10 pgs.
"Welcome to StatCounter—Visitor Analysis for Your Website", StatCounter, [Online]. Retrieved from the Internet: <URL: http://statcounter.com/>, (Accessed: Jul. 19, 2013), 17 pgs.
Bluttman, et al., "Excel Formulas and Functions for Dummies", Wiley Publishing, Inc.,, (2005), 280, 284-286.
Celik, T, "CSS Basic User Interface Module Level 3 (CSS3 UI)", Section 8; Resizing arid Overflow, [Online] retrieved from the internet: <http://www.w3.org/TR/2012/WD-css3-ui-20120117/#resizing-amp-overflow>, (Jan. 17, 2012), 1-58.

(56) References Cited

OTHER PUBLICATIONS

Chaudhuri, Surajit, et al., "An Overview of Business Intelligence Technology", Communications of the ACM, vol. 54, No. 8., (Aug. 2011), 88-98.

Chung, Chin-Wan, "Dataplex: An Access to Heterogeneous Distributed Databases", Communications of the ACM, Association for Computing Machinery, Inc., vol. 33, No. 1, (Jan. 1, 1990), 70-80.

Cohn, David, et al., "Semi-supervised Clustering with User Feedback", Cornell University, (2003), 9 pgs.

Gesher, Ari, "Palantir screenshots in the wild: Swing Sightings", https://www.palantir.com/2007/09/palantir-screenshotst, (Sep. 11, 2007), 1-12.

Gorr, et al., "Crime Hot Spot Forecasting: Modeling and Comparative Evaluation", Grant 98-IJ-CX-K005, (May 6, 2002), 37 pgs.

Gu, Lifang, et al., "Record Linkage: Current Practice and Future Directions", (Jan. 15, 2004), 32 pgs.

Hansen, D., et al., "Analyzing Social Media Networks with NodeXL: Insights from a Connected World", Chapter 4 & Chapter 10, (Sep. 2010), 38 pages.

Hardesty, Larry, "Privacy Challenges: Analysis: It's Surprisingly Easy to Identify Individuals from Credit-Card Metadata", MIT News on Campus and Around the World, MIT News Office, (Jan. 29, 2015), 1-3.

Hua, Yu, et al., "A Multi-attribute Data Structure with Parallel Bloom Filters for Network Services", HiPC 2006, LNCS 4297, (2006), 277-288.

Jelen, Bill, "Excel 2013 in Depth, Video Enhanced Edition", (Jan. 25, 2013), 20 pgs.

Manno, et al., "Introducing Collaboration in Single-user Applications through the Centralized Control Architecture", (2010), 10 pgs.

Palmas, et al., "An Edge-Bunding Layout for Interactive Parallel Coordinates", IEEE Pacific Visualization Symposium, (2014), 57-64.

Sigrist, Christian, et al., "PROSITE, a Protein Domain Database for Functional Characterization and Annotation", Nucleic Acids Research, vol. 38, (2010), D161-D166.

Valentini, Giorgio, et al., "Ensembles of Learning Machines", Lecture Notes in Computer Science: Neural Nets, Springer Berlin Heidelberg, (Sep. 26, 2002), 3-20.

Wang, Guohua, et al., "Research on a clustering Data De-Duplication Mechanism Based on Bloom Filter", IEEE, (2010), 5 pgs.

Wright, Brandon, et al., "Palantir Technologies VAST 2010 Challenge Text Records—Investigations into Arms Dealing", (Oct. 29, 2010), 10 pgs.

\* cited by examiner

GENERATING GRAPHICAL REPRESENTATIONS OF EVENT PARTICIPATION FLOW

CROSS-REFERENCE TO RELATED APPLICATIONS

The present application is a continuation application that claims the benefit of priority of U.S. Non-Provisional application Ser. No. 14/948,009 filed on Nov. 20, 2015, which claims the benefit of U.S. Provisional Application No. 62/244,585, filed on Oct. 21, 2015, which are both hereby incorporated herein by reference in their entirety.

TECHNICAL FIELD

The subject matter disclosed herein relates to computer graphics generation and processing. In particular, example embodiments relate to systems and methods for generating graphical representations of event participation flows for presentation by an electronic visual display.

BACKGROUND

Conventional flow diagrams are useful in representing structure and flow in a complex system or network. Typical flow diagrams illustrate an order of interactions (e.g., data transfers) between components or participants in the system or network. In this way, typical flow charts are suitable for illustrating event flow participation of a single participant engaged in a sequence of events over a certain period of time. However, typical flow diagrams fail to convey information regarding quantitative distribution of values involved in the interactions between components. Thus, while typical flow diagrams are useful in illustrating an event flow of a single participant, typical flow diagrams are not suitable to illustrate event flows of a group of participants engaged in multiple concurrent events. For example, though a typical flow chart may be suitable to illustrate a sequence of television shows viewed by a single viewer over a certain time period, a single typical flow chart would be unable to suitably illustrate an aggregate sequence of television shows viewed by a group of viewers over the same time period because the group of viewers are likely to be watching multiple different television shows during the same blocks of time. Additionally, although information regarding the individual participation of individual participants may be maintained in sources such as tables of numerical data, deriving an aggregate event flow of all such users from such sources can be difficult due to challenges involved in analyzing and understanding a bulk set of raw numerical data.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
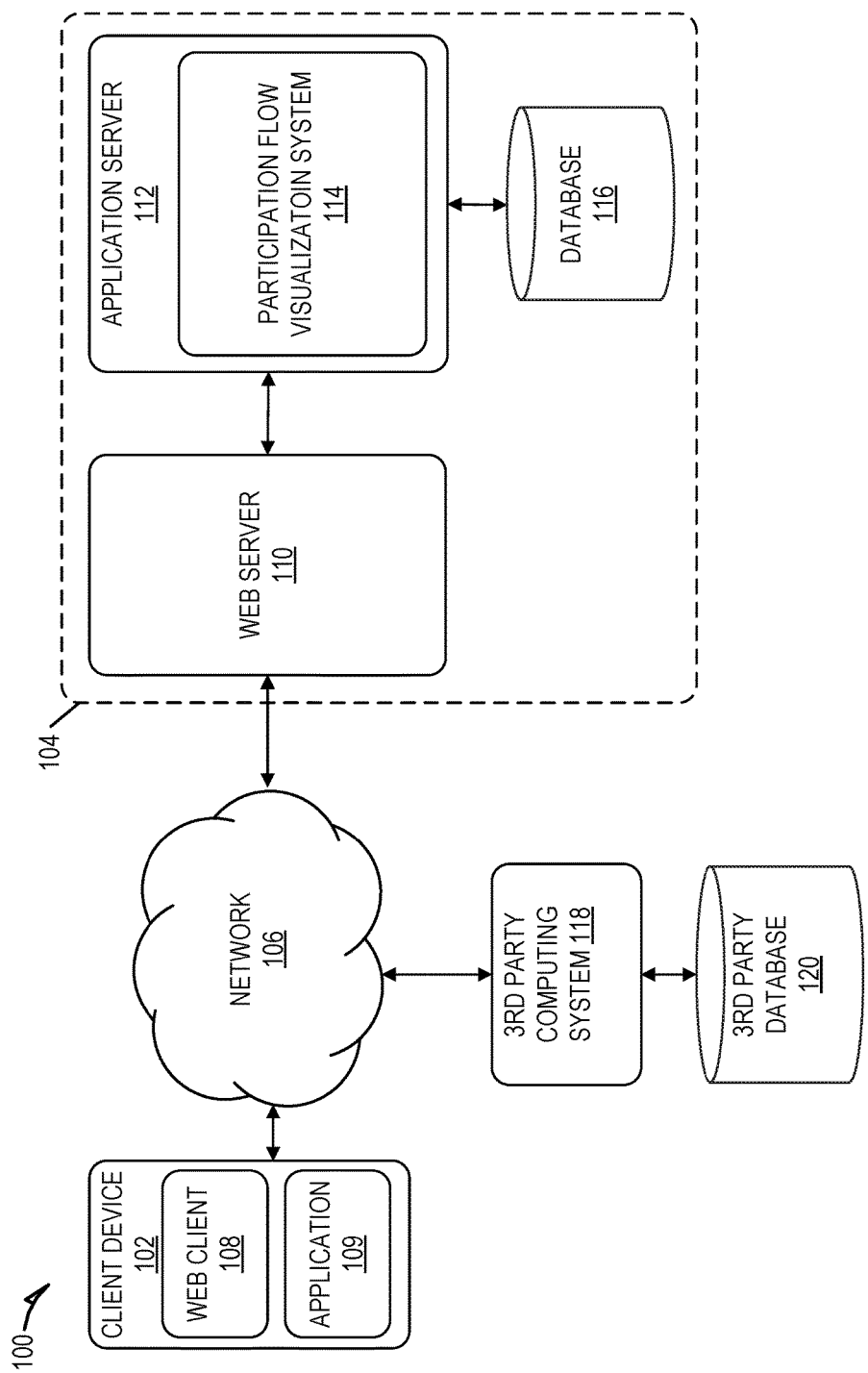
FIG. 1 is an architecture diagram depicting a data processing platform having a client-server architecture configured for exchanging data, according to an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure relate to systems and methods for generating graphical representations of event participation flows. An "event participation flow" includes a flow of participants of a subject event between events before and after the subject event. Accordingly, each event participation flow may include preceding events, which are events participated in by the participants prior to the subject event, and subsequent events, which are events participated in by the participants after the subject event.

Additional aspects of the present disclosure involve providing user interfaces to present graphical representations of event participation flows. The user interfaces include graphical elements representing events in the event participation flow and the relationships between each event. More specifically, the relationships illustrated in the graphical representations of event participation flows illustrate how participants transition between events and in what quantity. Accordingly, the graphical representations of event participation flows include indications of a number of participants for each event, an order of participation, and a number of participants that transition from participating in one event to another event.

Using interactive elements included in the user interface, a user may filter the graphical representations of event participation flows according to event category, event attributes, or participant attributes. The user interface includes other elements that allow users to group elements according to category such that the graphical representation is updated to illustrate the flow of participation between event categories. Additionally, the users may specify a secondary event in order to analyze the event participation flows of a subset of participants in the subject event that also participated in the secondary event.

As an example of the forgoing, the events included in event participation flows may correspond to content programming (e.g., a broadcast program or television program, which is also known as a "TV show" in common parlance), and the participants of the event correspond to views of the content programming. The event participation flows provided, according to this example, illustrate a transition of viewers between content programs. In this example, event categories by which a user may filter the graphical representations correspond to channels that broadcast individual content programs. In this way, users may visualize how viewers transition between programming provided by different channels. Further, in this example, the event attributes include a start and end time of broadcast of the programs, and the participant attributes include demographic information such as viewer's age, gender, location, marital status, income level, employment status, and the like.

As another example, the events included in event participation flows may correspond to a purchase of a product, and the participants of the event correspond to consumers who purchased the product. The event participation flows provided, according to this example, illustrate a sequence of purchases made by a group of consumers. As a more concrete example, the products may be insurance, and the event participation flows may include a sequence of insurance product purchases such as a purchase of car insurance, followed by a purchase of fire insurance, and then followed by a purchase of life insurance.

As yet another example, the events included in event participation flows may correspond to content viewed via web pages, and the participants of the event may correspond to viewers of the content. In this way, the event participation flows may be used to illustrate users' navigational flow through web pages or content of a web site or network.

FIG. 1 is an architecture diagram depicting a network system 100 having a client-server architecture configured for exchanging data, according to an example embodiment. While the network system 100 shown in FIG. 1 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

As shown, the network system 100 includes a client device 102 in communication with a data processing platform 104 over a network 106. The data processing platform 104 communicates and exchanges data with the client device 102 that pertains to various functions and aspects associated with the network system 100 and its users. Likewise, the client device 102, which may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) of the network system 100 to exchange data with the data processing platform 104 over the network 106.

The client device 102 communicates with the network 106 via a wired or wireless connection. For example, one or more portions of the network 106 may comprise an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 102 and the data processing platform 104 involve user-selected functions available through one or more user interfaces (UIs). The UIs may be specifically associated with a web client 108 (e.g., a browser) or an application 109, executing on the client device 102, and in communication with the data processing platform 104.

Turning specifically to the data processing platform 104, a web server 110 is coupled to (e.g., via wired or wireless interfaces), and provides web interfaces to, an application server 112. The application server 112 hosts one or more applications (e.g., web applications) that allow users to use various functions and services of the data processing platform 104. For example, the application server 112 may host an event participation flow visualization system 114 that is used to generate and present graphical representations of event participation flows. In some embodiments, the event participation flow visualization system 114 runs and executes on the application server 112, while in other embodiments, the application server 112 provides the client device 102 with a set of instructions (e.g., computer-readable code) that causes the web client 108 of the client device 102 to execute and run the event participation flow visualization system 114.

The event participation flow visualization system 114 analyzes data to determine a flow of participation in events by participants of a subject event. The subject event is user specified and serves as a subject for the participation flow visualization. An event participation flow represents the transition of participation by participants between multiple events. The event participation flow includes an aggregate of individual participation flows of the participants in the subject event. Each individual participation flow includes an event sequence of the participants that includes the subject event, one or more preceding events, and one or more subsequent events. Accordingly, the aggregate of individual event sequences (also referred to as "aggregate event sequence") represents an overall participation flow of the participants as it includes events participated in by the participants prior to participation in the subject event (e.g., preceding events) as well as events participated in by the participants subsequent to participation in the subject event.

Upon determining the participation flow of the participants of the subject event, the event participation flow visualization system 114 generates a graphical representation thereof. The event participation flow visualization system 114 transmits instructions to the client device 102 that cause the device to present a user interface for viewing and interacting with the graphical representation of the participation flow. As an example of the interactions provided by the user interface, users may filter the information displayed according to event category such that only events of a certain category are displayed, by event attributes such that only events with certain attributes are displayed, or by participant attributes such that only participants with certain attributes are included in the represented participation flow.

Further, users may specify an additional event for visualization along with the subject event. In response to a user specifying an additional event, the event participation flow visualization system 114 generates and causes presentation of the relationship between the subject event and the additional event that includes the sequence of the events along with other preceding and subsequent events participated in by the participants of the subject event and additional event.

The data analyzed by the event participation flow visualization system 114 includes event data that comprises a plurality of event data records. Each event data record includes information about an event. For example, each event data record includes an event identifier (e.g., a name), event attributes (e.g., event category, start time, and end time), and a list of event participant identifiers. The event data is linked to participant data including one or more participant data records. The participant data records include information about event participants. For example, each participant data record includes a participant identifier and participant attributes describing characteristics of event participants. Participant attributes may relate to demographic data, and, accordingly, may include participant gender, age, location information (e.g., hometown or current location), income level, employment history, or education history. Depending on the embodiment, the participant attributes may further include any one of the following: a type of contract or service plan the participant has with a particular company; an effective date of the contract or service plan; an average bill amount; an aggregate amount billed over a particular time period; a credit score; and a type of home (e.g., apartment or single family home).

Data analyzed by the event participation flow visualization system 114 (e.g., event data and participant data) is obtained from a third-party computing system 118 and in particular, a third-party database 120 communicatively coupled to the third-party computing system 118. The data may be routinely, automatically retrieved (e.g., nightly) by the event participation flow visualization system 114, or manually provided by a user of the third-party computing system 118 or the client device 102 for subsequent processing and analysis by the event participation flow visualization system 114.

The data obtained from the third-party computing system 118 is stored in a database 116, which is a machine-readable storage medium that is communicatively coupled to the application server 112 (e.g., via wired or wireless interfaces over the network 106). The data processing platform 104 may further include a database server (not shown) that facilitates access to the database 116. The database 116 may include multiple databases that may be internal or external to the data processing platform 104.

Figure 2:
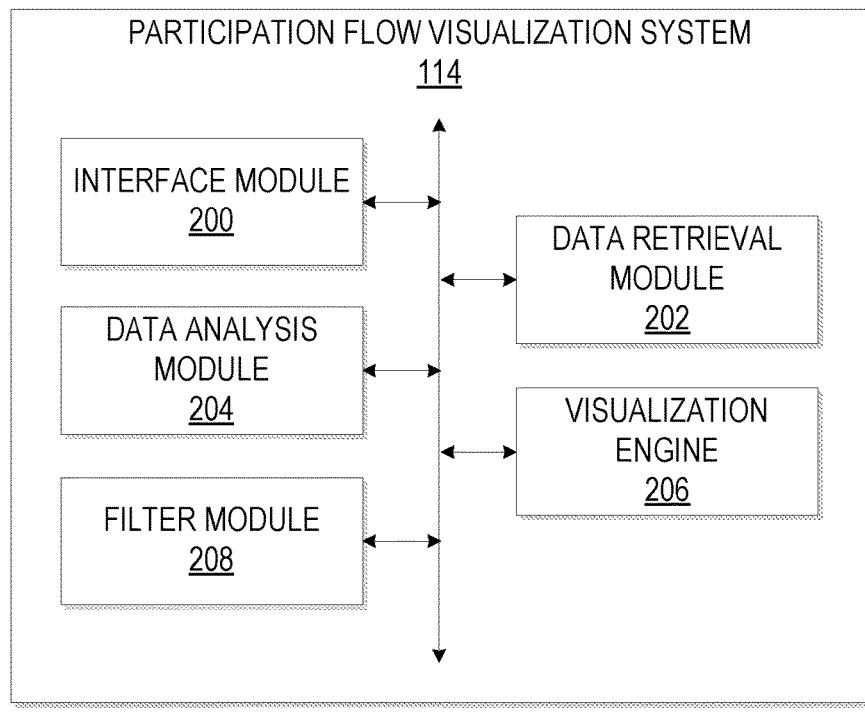
FIG. 2 is a block diagram illustrating various modules comprising a participation flow visualization system, which is provided as part of the data processing platform, consistent with some embodiments.

FIG. 2 is a block diagram illustrating various modules comprising the event participation flow visualization system 114, which is provided as part of the data processing platform 104, consistent with some embodiments. As is understood by skilled artisans in the relevant computer and Internet-related arts, the modules and engines illustrated in FIG. 2 represent a set of executable software instructions and the corresponding hardware (e.g., memory and processor) for executing the instructions. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the event participation flow visualization system 114 to facilitate additional functionality that is not specifically described herein. Furthermore, the various functional modules and engines depicted in FIG. 2 may reside on a single computer (e.g., a client device), or may be distributed across several computers in various arrangements such as cloud-based architectures.

The event participation flow visualization system 114 is shown as including an interface module 200, a data retrieval module 202, a data analysis module 204, a visualization engine 206, and a filter module 208 all configured to communicate with each other (e.g., via a bus, shared memory, a switch, or application programming interfaces (APIs)). The aforementioned modules of the event participation flow visualization system 114 may, furthermore, access the database 116, and each of the modules may access one or more computer-readable storage media of the client device 102.

The interface module 200 receives requests from various client devices and communicates appropriate responses to the requesting client devices. The interface module 200 provides a number of interfaces (e.g., APIs or user interfaces that are presented by the client device 102) that allow data to be received by the event participation flow visualization system 114. For example, the interface module 200 may receive requests from client devices in the form of Hypertext Transfer Protocol (HTTP) requests, API requests, or other web-based requests.

The interface module 200 also provides user interfaces that include graphical representations of event participation flows. The interface module 200 also receives and processes user input received through such user interfaces. An example of the user interfaces provided by the interface module 200 is discussed below in reference to FIG. 9.

The data retrieval module 202 is configured to retrieve data for processing and analysis. For example, the data retrieval module 202 obtains event data comprising a plurality of event data records. In some embodiments, the data retrieval module 202 retrieves such data from the third-party database 120 of the third-party computing system 118 through appropriate requests (e.g., API requests or calls) transmitted over the network 106. The data may be retrieved by the data retrieval module 202 on a periodic basis (e.g., nightly). In some embodiments, the data retrieval module 202 obtains data from a location specified by a user (e.g., via a user interface provided by the interface module 200).

The data analysis module 204 is configured to analyze data to determine event participation flows for participants of a subject event. The event participation flows represent a transition of participation between the subject event and multiple other events. Accordingly, an event participation flow includes the subject event, one or more preceding events, one or more subsequent events, and a flow quantity between each event. The subject event is specified by user input, and the participants of the subject event are identified based on information included in an event data record corresponding to the subject event. Preceding events are events in which one or more participants participated in prior to participating in the subject event. Subsequent events are events in which one or more participants participated in subsequent to participating in the subject event. The flow quantity between two events refers to a number of weighted or unweighted participants that transition from participating in one event to participating in another event.

The event participation flow is determined based on an aggregate of individual event sequences of each participant in the subject event. Accordingly, in determining the event participation flow of a set of participants, the data analysis module 204 determines an event sequence of each participant in the set. The event sequence is a sequence of events participated in by the same participant that includes the subject event. The data analysis module 204 determines the event participation flow of the set of participants by performing operations including identifying preceding events and subsequent events attended by at least one participant of the subject event. In some instances, the data analysis module 204 may determine that a participant did not participate in an event prior to the subject event, or that the participant did not participate in an event subsequent to the subject event.

The data analysis module 204 determines the preceding and subsequent events associated with each participant using a combination of information including event data (e.g., the list of participant identifiers for the event) and participant data (e.g., data regarding events participated in by the participants). For example, the data analysis module 204 may access participant data of the participants of the subject event that indicates the events participated in by each participant and is also linked to event data corresponding to these events. By cross referencing the participant data and the event data, the data analysis module 204 identifies preceding and subsequent events in which each participant has participated.

The data analysis module 204 further determines a participation quantity (e.g., a number of participants) for each identified preceding and subsequent event by summing a total number of participants associated with each respective event. The data analysis module 204 then determines flow quantities between each preceding event and the subject event, and between the subject event and each subsequent event. The data analysis module 204 determines the flow quantity between two events by determining the overlap of participants between the two events.

The visualization engine 206 is configured to generate graphical representations of the event participation flows determined by the data analysis module 204. The graphical representation of the event participation flows are presented in interfaces generated by the interface module 200. Each graphical representation includes graphical elements representing the subject events, preceding events, subsequent events, and the participation flows between each event. The participation flows are represented by connector elements, and a width of each connector element is proportional to a flow quantity (e.g., the number of participants that transitioned from participation in a first event to participation in a second event).

The user interfaces in which the graphical representations are presented include interactive elements that facilitate interaction of users with the graphical representations. For example, using an interactive element in the user interface, a user may specify one or more filters for the graphical representation. The filter module 208 is configured to filter the graphical representation of event participation flows according to the user filter selections. The filtering of the graphical representation of the event participation flows may include removing or modifying one or more graphical elements. The filter selections may, for example, include category filters that specify a particular category of event, event attribute filters that specify a particular event attribute (e.g., events with a particular start time), or participant attributes that specify a particular participant attribute (e.g., an age range).

Figure 3:
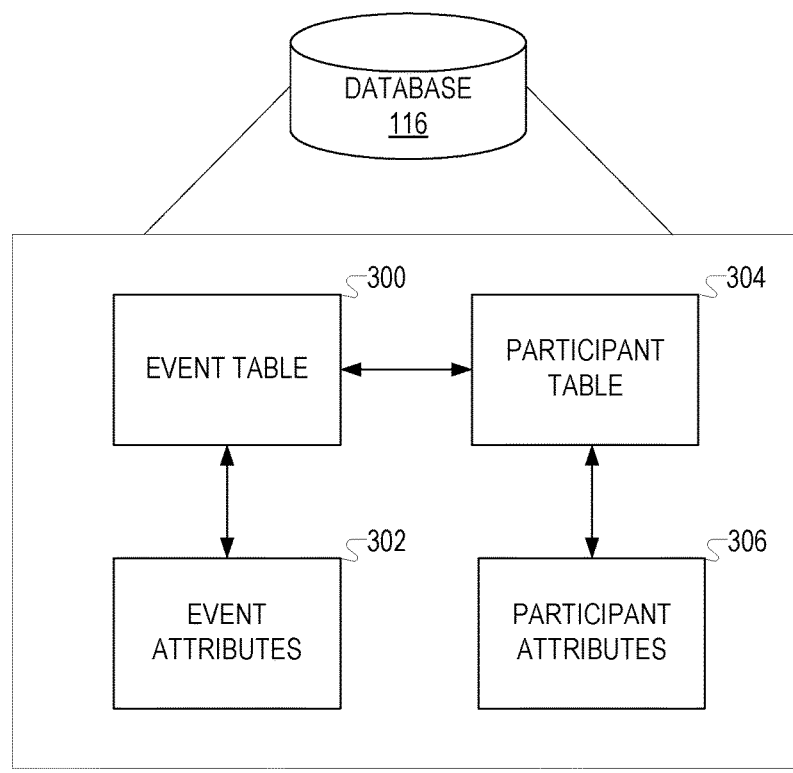
FIG. 3 is a high-level relationship diagram illustrating relationships between data maintained in a network database, which is provided as part of the data processing platform, and used in generating graphical representations of event participation flows, consistent with some embodiments.

FIG. 3 is a high-level relationship diagram illustrating relationships between data maintained in the database 116 and used in generating graphical representations of event participation flows, consistent with some embodiments. An event table 300 contains a plurality of event data records. Each event data record included in the event table 300 includes information about an event such as an event identifier (e.g., a name), a list of event participant identifiers, and event attributes 302. The event attributes 302 describe characteristics of an event. For example, the event attributes 302 may include an event category to which the event belongs, a start time, an end time, and a duration. Event data records within the event table 300 are indexed by event identifiers.

A participant table 304 includes a plurality of participant data records. The participant data records include information about event participants such as a participant identifier, a list of events in which the participant participated, and participant attributes 306 describing characteristics of event participants. Participant attributes 306 may, for example, relate to demographic data, and accordingly, may include participant gender, age, location information (e.g., hometown or current location), employment history, or education history. Each event record in the event table 300 is linked to one or more participant records within the participant table 304 so as to associate a particular event with the data records of its participants. Participant data records in the participant table 304 are indexed by participant identifier. Further, each participant data record in the participant table 304 may be linked to one or more event records within the event table 300 so as to associate a particular participant with the data records of events in which they have participated.

Figure 4:
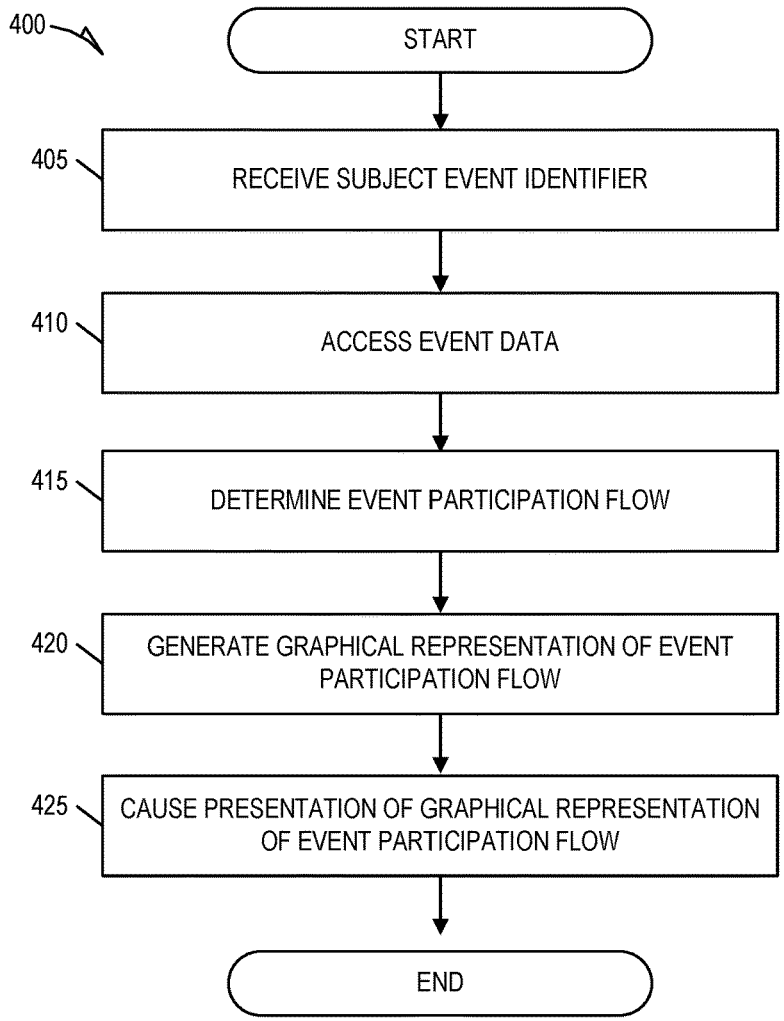
FIG. 4 is a flowchart illustrating a method for generating a graphical representation of event participation flow for a subject event, according to some embodiments.

FIG. 4 is a flowchart illustrating a method 400 for generating a graphical representation of event participation flow for a subject event, according to some embodiments. The method 400 is embodied in computer-readable instructions for execution by one or more processors such that the operations of the method 400 is performed in part or in whole by the application server 112. In particular, the operations of the method 400 is performed in part or in whole by the event participation flow visualization system 114; accordingly, the method 400 is described below by way of example with reference thereto. However, it shall be appreciated that at least some of the operations of the method 400 may be deployed on various other hardware configurations, and the method 400 is not intended to be limited to the application server 112 or the event participation flow visualization system 114.

At operation 405, the interface module 200 receives a subject event identifier. The subject event identifier, which identifies a subject event, is received via user input entered into a user interface provided by the interface module 200 and displayed on the client device 102. The subject event identifier may be specified by the user by inputting text in a text-input field of the user interface, by selecting the event identifier from a drop-down menu (or similar interface element) that includes a list of subject event identifiers, or by selecting a graphical element from an existing graphical representation of an event participation flow.

At operation 410, the data analysis module 204 accesses event data from the database 116. In some other embodiments, the data analysis module 204 accesses the event data from a location specified by the user, such as a local data repository of the client device 102. The event data includes a plurality of event data records including an event data record corresponding to the subject event. Each event data record includes an event identifier, event attributes (e.g., start time and end time), and a list of participant identifiers corresponding to participants of the event.

At operation 415, the data analysis module 204 determines an event participation flow for the list of participant identifiers of the subject event using the event data. The event participation flow includes the subject event, one or more preceding events, one or more subsequent events, and a flow quantity between each event. The event participation flow is determined by aggregating individual event sequences of each participant in the subject event. Accordingly, the event participation flow includes a flow quantity from each preceding event to the subject event, and a flow quantity from the subject event to each subsequent event. Further details regarding the determination of the aggregate event sequence are discussed below in reference to FIG. 7, according to some example embodiments.

At operation 420, the visualization engine 206 generates a graphical representation of the event participation flow of the participants of the subject event. The graphical representation of the event participation flow includes a plurality of graphical elements (e.g., blocks) representing the subject event, preceding events, subsequent events and the flow quantity of participants between the events. Each graphical element representing an event may include an indication of the number of participants for the event, a number of participants that participated in the event without participating in a preceding event, and a number of participants that participated in the event without participating in a subsequent event. In some instances, the number of participants in an event may be represented by a size of the graphical element representing the event. The flow of participants between events (e.g., flow from preceding event to subject event or subject event to subsequent event) are represented by connector elements (e.g., arrows), and the width of each connector element corresponds to the flow quantity of participants that have transitioned from one event to another.

At operation 425, the interface module 200 causes the presentation of a user interface that includes the graphical representation of the event participation flow of the participants of the subject event. For example, the interface module 200 provides the client device 102 with instructions that cause the client device 102 to present the user interface. The user interface used for displaying the graphical representation of the aggregate event sequence may, in some embodiments, be the same as the user interface for receiving the subject event identifier. In this manner, from the prospective of a user, once the subject event identifier is input into one portion of the user interface, the graphical representation of the event participation flow is then automatically displayed in another portion of the user interface. Further, the user may interact with the graphical representation of the event participation flow through interaction with elements of the user interface. For example, the user may select (e.g., by clicking on) one of the graphical elements representing a preceding or subsequent event to make that event the subject event, and, in response, the method 400 is repeated for the newly selected subject event.

Figure 5:
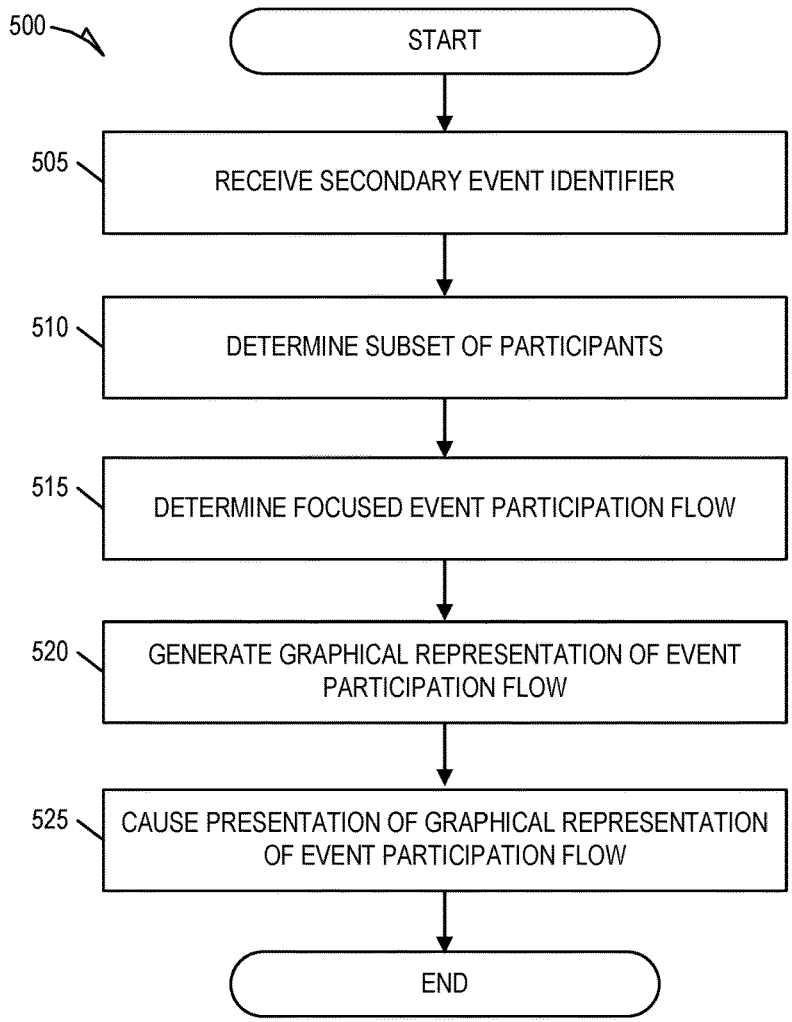
FIG. 5 is a flowchart illustrating a method for generating a graphical representation of event participation flow for multiple subject events, according to some embodiments.

As another example of the interaction provided by the user interface displaying the graphical representation of the event participation flow, the user may specify a secondary event in order to examine its relationship (e.g., the participation flow) with the subject event. FIG. 5 is a flowchart illustrating a method 500 for generating a graphical representation of event participation flow involving a subject event and a secondary event, according to some embodiments. The method 500 may be initiated subsequent to the completion of method 400. The method 500 is embodied in computer-readable instructions for execution by one or more processors such that the operations of the method 500 is performed in part or in whole by the application server 112. In particular, the operations of the method 500 is performed in part or in whole by the event participation flow visualization system 114; accordingly, the method 500 is described below by way of example with reference thereto. However, it shall be appreciated that at least some of the operations of the method 500 may be deployed on various other hardware configurations, and the method 500 is not intended to be limited to the application server 112 or the event participation flow visualization system 114.

At operation 505, the interface module 200 receives a secondary event identifier identifying a secondary event for analysis along with the subject event. As with the subject event identifier, the secondary event identifier is received via user input entered into a user interface provided by the interface module 200 and displayed on the client device 102. The secondary event identifier may be specified by the user by inputting text in a text-input field of the user interface, by selecting the event identifier from a drop-down menu (or similar interface element) that includes a list of subject event identifiers, or by selecting a graphical element from an existing graphical representation of an event participation flow.

At operation 510, the data analysis module 204 determines a subset of participants in the subject event that also participated in the secondary event. The data analysis module 204 determines the subset of participants based on the event data. More specifically, the data analysis module 204 determines the subset of participants by comparing the list of participant identifiers included in the event data record corresponding to the subject event with the list of participant identifiers included in the event data record corresponding to the secondary event.

At operation 515, the data analysis module 204 determines a focused event participation flow involving the subset of participants of the subject event that also participated in the secondary event. The determining of the focused event participation flow by the data analysis module 204 includes determining one or more preceding events participated in by at least one participant of the subset of participants, determining one or more subsequent events participated in by at least one participant of the subset of participants, determining a total number of participants for each of the preceding and subsequent events, and determining a flow quantity between each preceding event and the subject event, and between the subject event and each subsequent event.

At operation 520, the visualization engine 206 generates the graphical representation of the focused event participation flow that includes the subject event and the secondary event. The graphical representation of the event participation flow includes graphical representations of the subject event and graphical elements representing the one or more preceding events or the one or more subsequent events. The graphical representation further includes connector elements illustrating the flow of participation between each event and the width of each connector element represents the flow quantity.

At operation 525, the interface module 200 causes presentation of the graphical representation of the focused event participation flow that includes the subject event and the secondary event. For example, the interface module 200 transmits instructions to the client device 102 that cause the client device 102 to display a user interface including the graphical representation.

Figure 6:
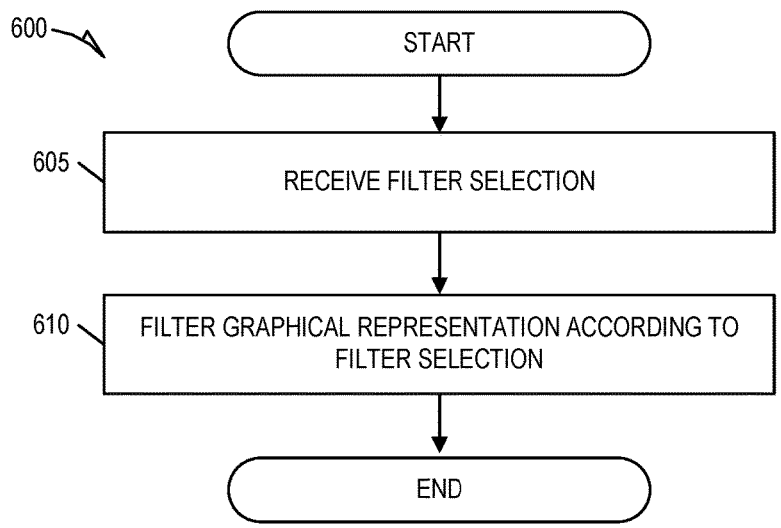
FIG. 6 is a flowchart illustrating a method for filtering graphical representations of an event participation flow, according to some embodiments.

As yet another example of the interaction provided by the user interface displaying the graphical representation of the event participation flow, the user may select one or more filters to reduce the elements displayed in the graphical representation to a particular subset of elements. FIG. 6 is a flowchart illustrating a method 600 for filtering graphical representations of an event participation flow, according to some embodiments. The method 600 is initiated subsequent to the completion of method 400. The method 600 is embodied in computer-readable instructions for execution by one or more processors such that the operations of the method 600 is performed in part or in whole by the application server 112. In particular, the operations of the method 600 is performed in part or in whole by the event participation flow visualization system 114; accordingly, the method 600 is described below by way of example with reference thereto. However, it shall be appreciated that at least some of the operations of the method 600 may be deployed on various other hardware configurations and the method 600 is not intended to be limited to the application server 112 or the event participation flow visualization system 114.

At operation 605, the interface module 200 receives a filter selection entered as user input into the user interface displaying the graphical representation of the event participation flow. The filter may be selected from a drop-down menu, check box, or other such interactive element included in the user interface. The filter selection may, for example, be: a category filter specifying an event category; a participant filter specifying a participant attribute; or an event attribute filter specifying an event attribute.

At operation 610, the filter module 208 filters the graphical representation of the event participation flow according to the received filter selection. The filter of the graphical representation includes removing or modifying one or more graphical elements in accordance with the filter selection. For example, when the filter selection is an event category, the filter module 208 filters the graphical representation of the aggregate event sequence to include a subset of the graphical elements that correspond to representations of events in the event category. When the filter selection is a participant filter, the filter module 208 works in conjunction with the visualization engine 206 to update the graphical representation such that only participants having the specified participant attribute are included in the aggregate event sequence. When the filter selection is an event attribute filter, the filter module 208 filters the graphical representation of the event participation flow to include a subset of the graphical elements that correspond to representations of events having the event attribute.

Figure 7:
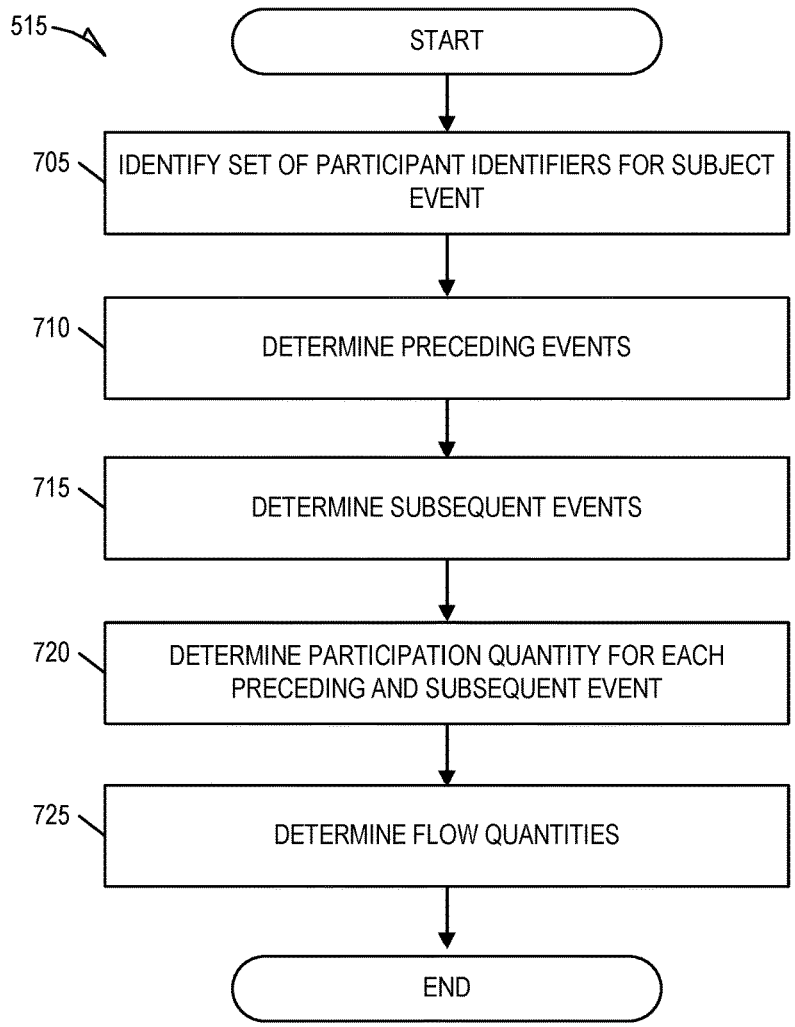
FIG. 7 is a flowchart illustrating a method for determining an event participation flow for a set of participants, according to some embodiments.

FIG. 7 is a flowchart illustrating a method 515 for determining an event participation flow for a set of participants, according to some embodiments. The method 515 is embodied in computer-readable instructions for execution by one or more processors such that the operations of the method 515 is performed in part or in whole by the application server 112. In particular, the operations of the method 515 is performed in part or in whole by the event participation flow visualization system 114; accordingly, the method 515 is described below by way of example with reference thereto. However, it shall be appreciated that at least some of the operations of the method 515 may be deployed on various other hardware configurations and the method 515 is not intended to be limited to the application server 112 or the event participation flow visualization system 114.

At operation 705, the data analysis module 204 identifies a set of participants for the subject event. The subject event corresponds to a received subject event identifier (e.g., the received subject event identifier discussed above in reference to operation 405 of method 400). The data analysis module 204 identifies the set of participants for the subject event by accessing the event data record of the subject event, which includes a list of participant identifiers for the subject event.

At operation 710, the data analysis module 204 determines preceding events participated in by at least one participant of the subject event. A preceding event is an event participated in by a participant prior to participating in the subject event. At operation 715, the data analysis module 204 determines subsequent events participated in by at least one participant of the subject event. A subsequent event is an event participated in by a participant subsequent to participating in the subject event. The data analysis module 204 determines the preceding and subsequent events using a combination of information including event data records (e.g., the list of participant identifiers for the event) and participant data records (e.g., events participated in by the participants). For example, the data analysis module 204 may access participant data records corresponding to the list of participant identifiers for the subject event. Each of the accessed participant data records indicates the events participated in by the participant and is linked to the event data records corresponding to these events. Using the start and end time event attributes of each event data record attended by an individual participant, the data analysis module 204 identifies preceding and subsequent events in which the individual participant participated. In some instances, the data analysis module 204 may determine that one or more participants of the subject event did not participate in an event prior to the subject event, or that one or more participants did not participate in an event subsequent to the subject event.

At operation 720, the data analysis module 204 determines a participation quantity (e.g., a number of participants) for each preceding and subsequent event identified at operations 710 and 715, respectively. The participation quantity of the preceding and subsequent events is determined by summing a total number of participants associated with each respective event.

At operation 725, the data analysis module 204 determines flow quantities between each preceding event and the subject event, and between the subject event and each subsequent event. The data analysis module 204 determines the flow quantity between each preceding and subsequent event and the subject event by calculating a sum of participants of the subject event that also participated in the respective preceding or subsequent event.

Figure 8:
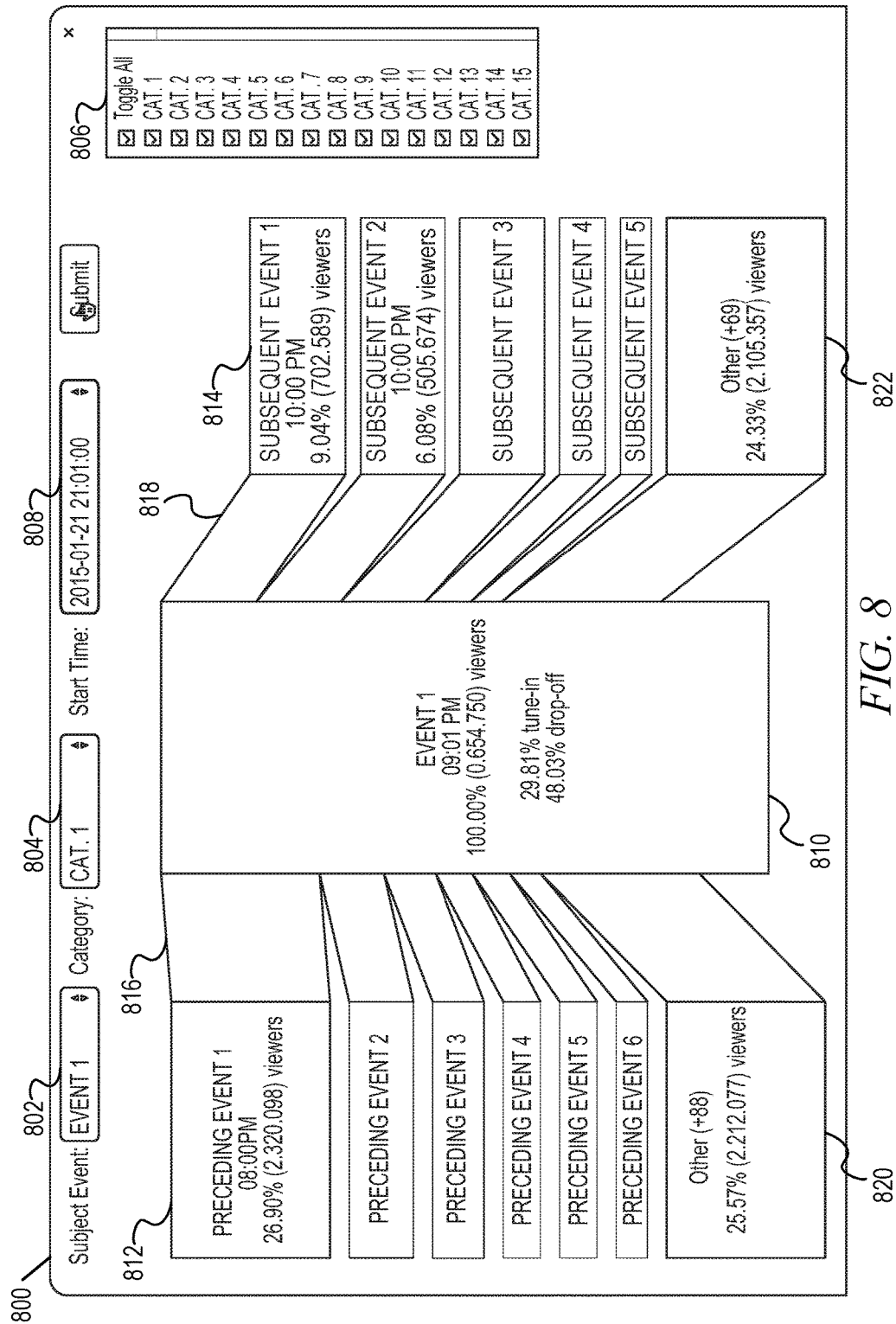
FIG. 8 is an interface diagram illustrating a user interface that includes a graphical representation of an event participation flow for a set of participants, according to some embodiments.

FIG. 8 is an interface diagram illustrating a user interface 800 that includes a graphical representation of an event participation flow for a set of participants, according to some embodiments. As shown, the user interface 800 includes a drop-down menu 802 that includes a list of events from which a user may select (e.g., using a mouse cursor) a subject event for event participation flow visualization. Upon receiving the user's selection of a subject event from the drop-down menu 802, a graphical representation of event participation flow involving the subject event is displayed. The user interface 800 further includes a drop-down menu 804 that includes a list of event categories from which the user may select (e.g., using a mouse cursor) a category filter to cause the graphical representation to be filtered according to that event category (e.g., only events from within the selected category are displayed). As an alternative to the drop-down menu 804, the user interface 800 also includes a window 806 that includes a plurality of check boxes corresponding to categories from which a user may select one or more category filters to cause the graphical representation to be filtered according to the one or more selected filters. The user interface 800 also includes a drop-down menu 808 that includes a list of event attributes (e.g., start times) from which the user may select (e.g., using a mouse cursor) an event attribute filter to cause the graphical representation to be filtered according to that event attribute (e.g., only events with the selected attribute are displayed). In the example embodiment illustrated in FIG. 8, the particular attribute included in the drop-down menu 808 is the start time of events.

As shown, the graphical representation of the event flow participation includes the graphical element 810 that represents the subject event. The graphical element 810 includes textual information about the event including an event title, information describing attributes of the event, a number of participants in the subject event, a number of participants in the event that did not participate in an event prior to the subject event (illustrated in FIG. 8 as "tune-in" percentage), and a number of participants that did not participate in an event subsequent to the subject event (illustrated in FIG. 8 as "drop-off" percentage). Additionally, the size of the graphical element 808 relative to the other elements in the graphical representation indicates the number of participants in the event.

The graphical representation of the event flow participation further includes graphical elements that represent preceding events, which are events participated in by the participants of the subject event prior to participating in the subject event. For example, graphical element 812 represents "Preceding Event 1."

The graphical representation of the event flow participation further includes graphical elements that represent subsequent events, which are events participated in by the participants of the subject event subsequent to participating in the subject event. For example, graphical element 814 represents "Subsequent Event 1." Each of the graphical elements representing an event may include textual information about the event including, for example, an event title, event attributes, and a number of participants in the event. Additionally, the graphical elements representing events may be color coded according to the event category to which they belong.

The graphical elements representing events also include a textual indication of a percentage of participants in the subject event that are represented by the participants of the event the graphical element represents. Further, the size of each of the graphical elements relative to the size of the graphical element 820 represent the percentage of participants in the subject event that participated in the event the graphical element represents.

The graphical elements representing the preceding events are connected to the graphical element 810 representing the subject event by connector elements, and the graphical element 810 representing the subject event is also connected to the graphical elements representing subsequent events by connector elements. For example, graphical element 812 is connected to graphical element 810 by connector element 816, and the graphical element 810 is also connected to graphical element 814 by a connector element 818. The connector elements represent the flow of participants between events. A width of each connector represents a flow quantity. The flow quantity may represent a number of weighted or unweighted participants.

In some instances, a graphical element included in the graphical representation of event flow participation may represent multiple events. For example, events having a number of participants below a predefined threshold may be grouped together into a single element and labeled "other" as is the case with graphical elements 820 and 822 illustrated in FIG. 8. The predefined threshold may be defined by a system administrator or specified by a user. As another example, events may be grouped together according to category such that the graphical elements in the graphical representation of the event participation flow represent all events within the category, the number of participants is the number of participants in events within the category, and the connector elements represent flows between participants in the various event categories.

Figure 9:
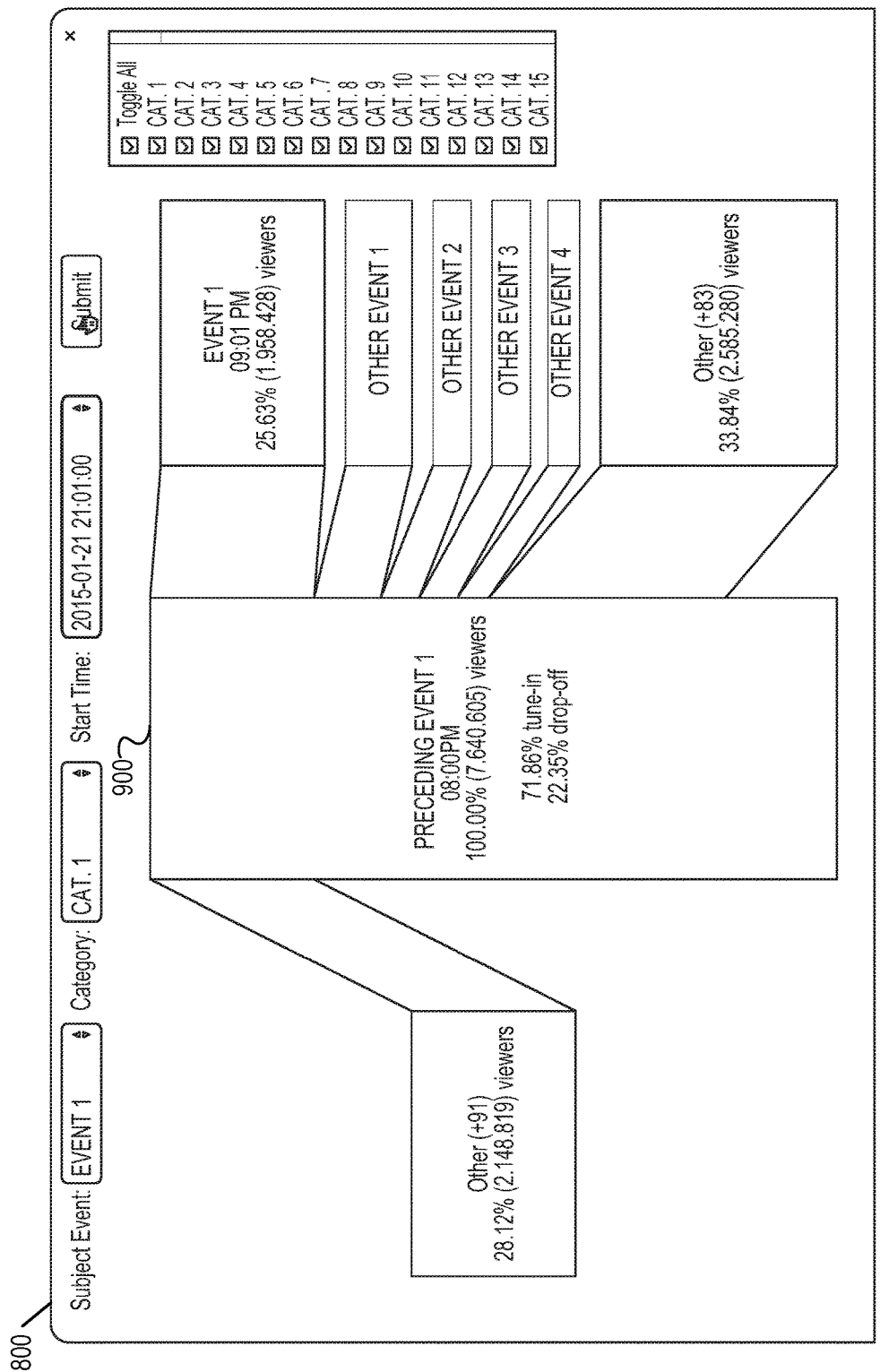
FIG. 9 is an interface diagram illustrating a user interface updated to display a graphical representation of a different event participation flow, according to example embodiments.

A user may specify a new subject event for event participation visualization by selecting another event from the list of events included in the drop-down menu 802 or through selection of one of the graphical elements representing a preceding or subsequent event. For example, upon receiving a user selection of the graphical element 812 (e.g., by positioning the mouse cursor over the element and clicking it), the event participation flow visualization system 114 generates and causes presentation of a graphical representation of an updated event participation flow with the preceding event represented by the graphical element 812 ("Preceding Event #1") as the subject event. FIG. 9 is an interface diagram illustrating the user interface 800 updated to display a graphical representation of different event participation flow. More specifically, the graphical representation of the event participation flow illustrated in FIG. 9 represents the flow of participation of participants in the event ("Preceding Event #1") that was previously represented by graphical element 810 in FIG. 8, and is now the subject event of the visualization represented by graphical element 900.

Figure 10:
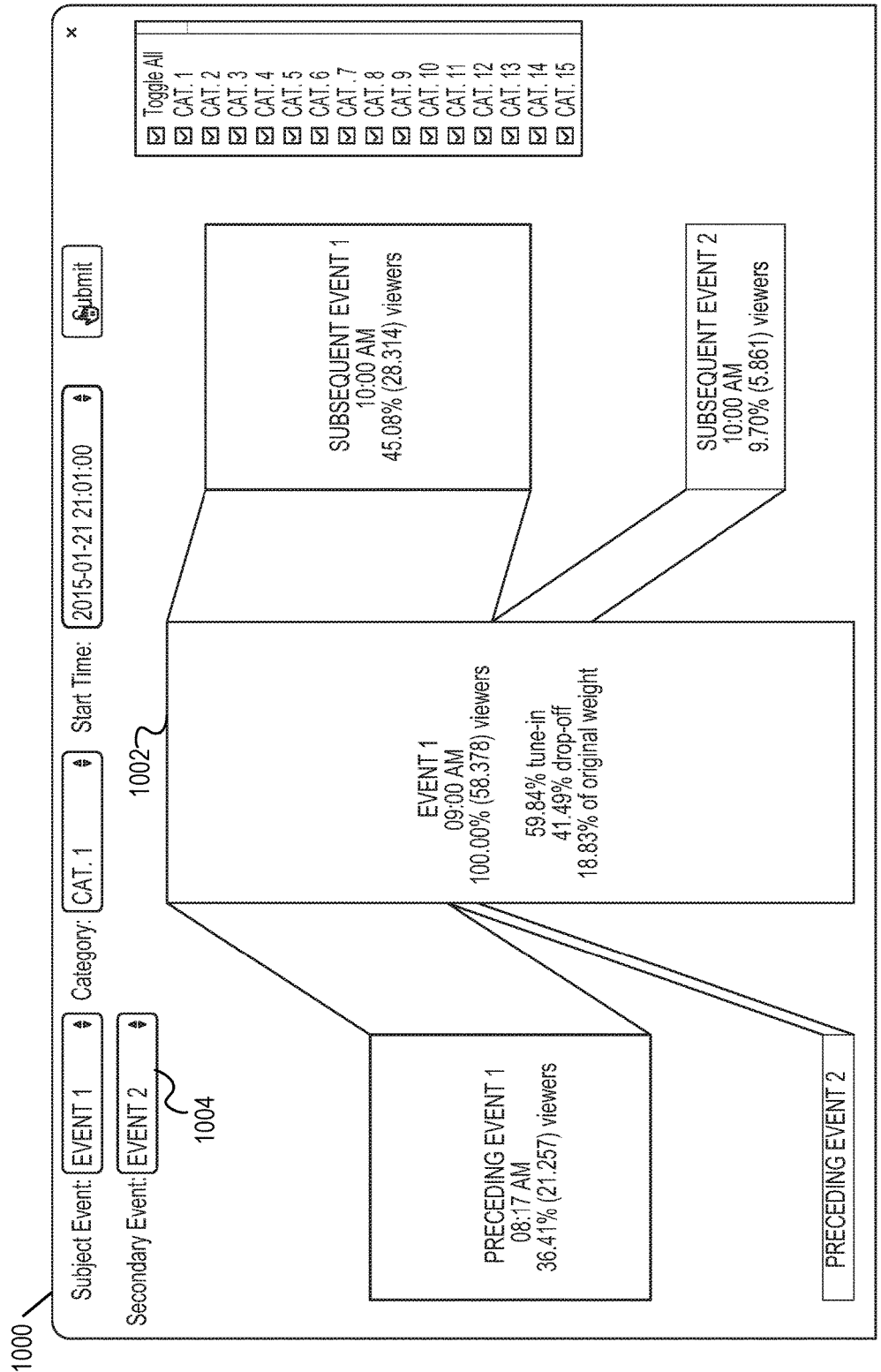
FIG. 10 is an interface diagram illustrating a user interface displaying a graphical representation of a focused event participation flow.

FIG. 10 is an interface diagram illustrating a user interface 1000 displaying a graphical representation of a focused event participation flow. The event participation flow is "focused" in the sense that the set of participants involved in the event participation flow is actually a subset of the participants of the subject event (represented by graphical element 1002) that also participated in a user specified secondary event selected using drop-down menu 1004. As with the graphical representation of participation flows discussed above in reference to FIGS. 9 and 10, the graphical representation of the focused event participation flow illustrated in FIG. 10 includes graphical elements representing preceding events and subsequent events of the subset of participants. Further, each of these graphical elements include similar characteristics to those graphical elements discussed above in reference to FIGS. 9 and 10.

Figure 11:
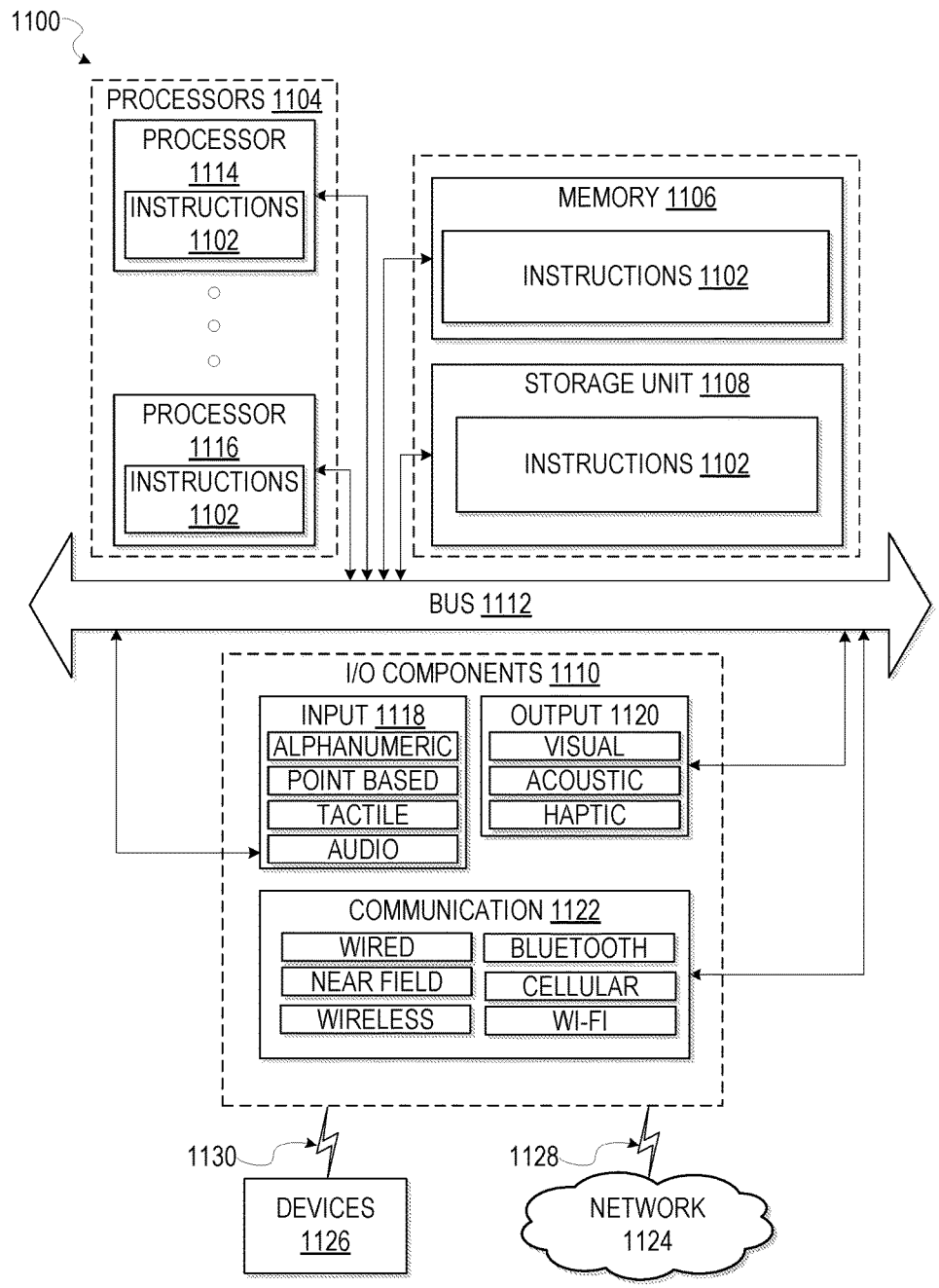
FIG. 11 is a diagrammatic representation of a machine in the example form of a computer system within which a set of instructions for causing the machine to perform any one or more of the methodologies discussed herein may be executed.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a system, within which instructions 1102 (e.g., software, a program, an application, an applet, an app, a driver, or other executable code) for causing the machine 1100 to perform any one or more of the methodologies discussed herein may be executed. For example, the instructions 1102 include executable code that causes the machine 1100 to execute the methods 400, 500, 600, and 700. In this way, these instructions transform the general, non-programmed machine into a particular machine programmed to carry out the described and illustrated functions in the manner described herein. The machine 1100 may operate as a standalone device or may be coupled (e.g., networked) to other machines.

By way of non-limiting example, the machine 1100 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1102, sequentially or otherwise, that specify actions to be taken by machine 1100. Further, while only a single machine 1100 is illustrated, the term "machine" shall also be taken to include a collection of machines 1100 that individually or jointly execute the instructions 1102 to perform any one or more of the methodologies discussed herein.

The machine 1100 may include processors 1104, memory 1106, storage unit 1108 and I/O components 1110, which may be configured to communicate with each other such as via a bus 1112. In an example embodiment, the processors 1104 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1114 and processor 1116 that may execute instructions 1102. The term "processor" is intended to include multi-core processors that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core process), multiple processors with a single core, multiple processors with multiples cores, or any combination thereof.

The memory 1106 (e.g., a main memory or other memory storage) and the storage unit 1108 are both accessible to the processors 1104 such as via the bus 1112. The memory 1106 and the storage unit 1108 store the instructions 1102 embodying any one or more of the methodologies or functions described herein. In some embodiments, the database 116 resides on the storage unit 1108. The instructions 1102 may also reside, completely or partially, within the memory 1106, within the storage unit 1108, within at least one of the processors 1104 (e.g., within the processor's cache memory), or any suitable combination thereof, during execution thereof by the machine 1100. Accordingly, the memory 1106, the storage unit 1108, and the memory of processors 1104 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 1102. The term "machine-readable medium" shall also be taken to include any medium, or combination of multiple media, that is capable of storing instructions (e.g., instructions 1102) for execution by a machine (e.g., machine 1100), such that the instructions, when executed by one or more processors of the machine 1100 (e.g., processors 1104), cause the machine 1100 to perform any one or more of the methodologies described herein (e.g., method 400, 500, 600, and 700). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1110 may include a wide variety of components to receive input, provide output, produce output, transmit information, exchange information, capture measurements, and so on. The specific I/O components 1110 that are included in a particular machine will depend on the type of machine. For example, portable machines such as mobile phones will likely include a touch input device or other such input mechanisms, while a headless server machine will likely not include such a touch input device. It will be appreciated that the I/O components 1110 may include many other components that are not specifically shown in FIG. 11. The I/O components 1110 are grouped according to functionality merely for simplifying the following discussion and the grouping is in no way limiting. In various example embodiments, the I/O components 1110 may include input components 1118 and output components 1120. The input components 1118 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 1120 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1110 may include communication components 1122 operable to couple the machine 1100 to a network 1124 or devices 1126 via coupling 1128 and coupling 1130, respectively. For example, the communication components 1122 may include a network interface component or other suitable device to interface with the network 1124. In further examples, communication components 1122 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1126 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method for analyzing and facilitating an understanding of event data, the method comprising:
   determining, using one or more processors, an event participation flow associated with a subject event, the event participation flow including a transition of participation from one or more preceding events to the subject event and from the subject event to one or more subsequent events;
   causing presentation of a graphical representation of the event participation flow in a user interface displayed on a client device, the graphical representation comprising:
   a first graphical element corresponding to the subject event, the first graphical element including an indication of a number of participants that participated in the subject event,
   a second graphical element corresponding to a preceding event,
   a third graphical element corresponding to a subsequent event,
   a first connector element connecting the first graphical element to the second graphical element, the first connector element representing a flow quantity of participants from the preceding event to the subject event; and
   a second connector element connecting the first graphical element to the third graphical element, the second connector element representing a flow quantity of participants from the subject event to the subsequent event;
   receiving a user selection, via the user interface, of one or more filters; and
   in response to receiving the user selection, modifying the graphical representation of the event participation flow to include a subset of overall participants in the event participation flow that corresponds to the one or more filters, the modifying of the graphical representation including modifying a size of one or more elements of the graphical representation, the size of each of the one or more elements representing a number of participants.

2. The method of claim 1, wherein:
   the filter includes a category filter specifying an event category; and
   the modifying of the graphical representation further includes modifying the presentation of the graphical representation of the event participation flow to include a subset of the plurality of graphical elements, the subset of graphical elements corresponding to events of the event category.

3. The method of claim 1, wherein:
the one or more filters include a participant filter specifying a participant attribute; and
the subset of overall participants in the event participation flow includes participants having the participant attribute.

4. The method of claim 3, wherein the participant attribute is a selection from the group comprising: gender, age, location, and income level.

5. The method of claim 1, wherein:
the one or more filters includes an event filter specifying an event attribute; and
the modifying of the graphical representation further includes modifying the presentation of the graphical representation of the event participation flow to include a subset of events from the event participation flow, the subset of events including events with the event attribute.

6. The method of claim 1, further comprising:
receiving an additional event identifier entered as input via the user interface;
determining an additional event participation flow involving the subject event and the additional event; and
causing presentation of a graphical representation of the additional event participation flow in the user interface displayed by the client device.

7. The method of claim 1, further comprising:
receiving selection of the second graphical element or the third graphical element;
determining an additional participation flow corresponding to the preceding event or the subsequent event in response to selection of the second graphical element or the third graphical element; and
causing presentation of a graphical representation of the additional participation flow in place of the graphical representation of the participation flow.

8. The method of claim 1, wherein the first graphical element includes at least one of:
an indication of a number of participants that participated in the subject event without participating in the preceding event; and
an indication of a number of participants that participated in the subject event without participating in the subsequent event.

9. The method of claim 1, further comprising accessing event data stored in a network database, the event data including a plurality of event data records, each of the plurality of event data records corresponding to an event and including a set of participant identifiers corresponding to participants in the event, the plurality of event data records including a data record corresponding to the subject event;
wherein the determining of the event participation flow is based on an analysis of the event data.

10. The method of claim 1, wherein:
a width of the first connector element represents a number of participants that participated in the preceding event and the subject event; and
a width of the second connector element represents a number of participants that participated in the subject event and the subsequent event.

11. The method of claim 1, wherein the graphical representation includes a fourth graphical element representing two or more events, each of the two or more events having a number of participants below a predefined threshold.

12. The method of claim 1, wherein the event participation flow is determined based on an aggregate of event sequences participated in by each participant of the subject event.

13. The method of claim 1, further comprising combining two or more events into a single graphical element in response to user selection of an event category, the two or more events corresponding to the event category.

14. A system comprising:
at least one processor of a machine;
a first machine-readable medium storing event data, the event data comprising a plurality of event data records, each of the plurality of event data records corresponding to an event and including a set of participant identifiers corresponding to participants in the event; and
a second machine-readable medium storing instructions that, when executed by the at least one processor of a machine, cause the machine to perform operations comprising:
determining an event participation flow associated with a subject event, the event participation flow including a transition of participation from one or more preceding events to the subject event and from the subject event to one or more subsequent events; and
causing presentation of a graphical representation of the event participation flow in a user interface displayed on a client device, the graphical representation comprising:
a first graphical element corresponding to the subject event, the first graphical element including an indication of a number of participants that participated in the subject event,
a second graphical element corresponding to a preceding event,
a third graphical element corresponding to a subsequent event,
a first connector element connecting the first graphical element to the second graphical element, the first connector element representing a flow quantity of participants from the preceding event to the subject event; and
a second connector element connecting the first graphical element to the third graphical element, the second connector element representing a flow quantity of participants from the subject event to the subsequent event;
receiving a user selection, via the user interface, of one or more filters; and
in response to receiving the user selection, modifying the graphical representation of the event participation flow to include a subset of overall participants in the event participation flow that corresponds to the one or more filters, the modifying of the graphical representation including modifying a size of one or more elements of the graphical representation, the size of each of the one or more elements representing a number of participants.

15. The system of claim 14, wherein:
the one or more filters include a category filter specifying an event category; and
the modifying of the graphical representation further includes modifying the presentation of the graphical representation of the event participation flow to include a subset of the plurality of graphical elements, the subset of graphical elements corresponding to events of the event category.

16. The system of claim 14, wherein:
the one or more filters include a participant filter specifying a participant attribute; and
the subset of overall participants in the event participation flow includes participants having the participant attribute.

17. The system of claim 14, wherein:
the one or more filters includes an event filter specifying an event attribute; and
the modifying of the graphical representation further includes modifying the presentation of the graphical representation of the event participation flow to include a subset of the event participation flow, the subset of the event participation flow corresponding to events with the event attribute.

18. The system of claim 14, wherein the operations further comprise:
receiving an additional event identifier entered as input via the user interface;
determining an additional event participation flow involving the subject event and the additional event; and
causing presentation of a graphical representation of the additional event participation flow in the user interface displayed by the client device.

19. The system of claim 14, wherein the determining the event participation flow includes:
determining a preceding event for each participant of the subject event;
determining a subsequent event for each participant of the subject event;
determining a participation quantity for each of the one or more preceding events and for the one or more subsequent events, the participation quantity including a number of participants in a respective event; and
determining flow quantities between each of the preceding events and the subject event and between the subject event and each of the subsequent events.

20. A machine-readable storage medium embodying instructions that, when executed by at least one processor of a machine, cause the machine to perform operations comprising:
determining an event participation flow associated with a subject event, the event participation flow including a transition of participation from one or more preceding events to the subject event and from the subject event to one or more subsequent events; and
causing presentation of a graphical representation of the event participation flow in a user interface displayed on a client device, the graphical representation comprising:
a first graphical element corresponding to the subject event, the first graphical element including an indication of a number of participants that participated in the subject event,
a second graphical element corresponding to a preceding event,
a third graphical element corresponding to a subsequent event,
a first connector element connecting the first graphical element to the second graphical element, the first connector element representing a flow quantity of participants from the preceding event to the subject event; and
a second connector element connecting the first graphical element to the third graphical element, the second connector element representing a flow quantity of participants from the subject event to the subsequent event;
receiving a user selection, via the user interface, of one or more filters; and
in response to receiving the user selection, modifying the graphical representation of the event participation flow to include a subset of overall participants in the event participation flow that corresponds to the one or more filters, the modifying of the graphical representation including modifying a size of one or more elements of the graphical representation, the size of each of the one or more elements representing a number of participants.

* * * * *